United States Patent [19]

Patrick

[11] Patent Number: 4,543,785
[45] Date of Patent: Oct. 1, 1985

[54] TURBO-RAM-JET ENGINE

[76] Inventor: Hugh Patrick, Flat 3, 55 Holmes Rd., Moonee Ponds, Victoria, Australia

[21] Appl. No.: 511,487

[22] Filed: Jul. 7, 1983

[30] Foreign Application Priority Data

Jul. 7, 1982 [AU] Australia .............................. 85718/82
Aug. 18, 1982 [AU] Australia .............................. PF5436

[51] Int. Cl.⁴ ............................................. F02G 1/00
[52] U.S. Cl. ..................................... 60/263; 60/270.1; 60/39.33
[58] Field of Search ...................... 60/226.1, 261, 262, 60/263, 270.1, 39.33

[56] References Cited

U.S. PATENT DOCUMENTS

| | | |
|---|---|---|
| 2,672,726 | 3/1954 | Wolf et al. .......................... 60/226.1 |
| 2,952,973 | 9/1960 | Hall et al. .............................. 60/262 |
| 4,122,670 | 10/1978 | Reider .................................... 60/733 |
| 4,271,666 | 6/1981 | Hurley et al. ...................... 60/262 X |

FOREIGN PATENT DOCUMENTS

| | | |
|---|---|---|
| 625596 | 6/1949 | United Kingdom . |
| 761182 | 11/1956 | United Kingdom . |
| 955013 | 4/1963 | United Kingdom . |
| 1268515 | 3/1972 | United Kingdom . |
| 1408309 | 10/1975 | United Kingdom . |

*Primary Examiner*—Louis J. Casaregola
*Assistant Examiner*—Donald E. Stout
*Attorney, Agent, or Firm*—Fleit, Jacobson, Cohn & Price

[57] ABSTRACT

A high speed, high-altitude jet aircraft engine operable as a ram-jet and/or turbo-jet using a single combustion chamber in a main housing receiving compressed air and also a variable flow of ram air bypassing the compressor. Primary and secondary burners in different parts of the combustion chamber produce respectively a major high temperature portion of burnt gas exhausted direct through a main nozzle and a minor lower temperature portion ducted off to drive the turbine which is in a side housing, the minor portion being exhausted through a subordinate nozzle.

7 Claims, 8 Drawing Figures

TURBO-RAM-JET ENGINE

This invention relates to jet engines (including aircraft engines) of the kind including an air intake, compressor, combustion chamber, turbine and exhaust nozzle, all so arranged that on its way to the nozzle the burnt gas operates the turbine which drives the compressor, such that, ideally, the turbine extracts from the effluent gases only so much energy as is required to drive the compressor.

Essentially this is the well-known principle of operation of the so called turbo-jet engine. It is also well-established that such engines are often very inefficient at high and low speeds. In an attempt to alleviate such shortcomings, turbo-jet engines have been provided with ram-jet facilities and with bypass ducts whereby "ram air" can be passed into a separate combustion chamber from which burnt gases are permitted direct egress to the exhaust nozzle. However in order to render such ram-jet facilities operational, it has sometimes been necessary to close down whole or part of the turbo-jet function. This can be inconvenient and inefficient. At low speeds, at which the turbo-jet exhaust velocities may still be inefficiently high, attempts have been made to increase the effective exhaust nozzle area by means of side-ducts whereby wholly or partially compressed air bypasses both combustion chamber and turbine. This kind of engine can be complicated, because multiple compression stages are usually required.

An object of the invention is to improve the overall efficiency of a turbo-ram-jet engine.

Another object is to sustain efficiency of the engine over a wide range of speeds.

Yet another object is to provide a jet engine having superior efficiency at high speeds and/or altitudes.

A further object is to provide a jet engine in which combustion temperatures can readily be matched to gas flow rates so as to increase thrust without undue risk of damage due to overheating.

Other objects and advantages will become apparent hereinafter.

Accordingly the present invention provides a jet engine of the kind indicated wherein at least part of the air intake bypasses the main compression stage and is led directly into the combustion chamber, from which at least part of the burnt gas bypasses the turbine and is exhausted directly through the nozzle. Provision may be made for varying the effective area of the passages.

It has been found that this enables me to make fairly easily, and with substantially sustained efficiency, a progressive and smooth changeover from turbo-jet to ram-jet mode, and vice versa, with the capability of varying at will, and with relative ease, the proportion of the total thrust that derives from each mode or function.

The compression can be effected by a single axial-flow, multi-disc compressor driven by a turbine in a collateral housing external to a main housing by means of a suitable offset arrangement using bevel gears or the like. Part of the burnt gases can be bypassed to operate the turbine and thence exhausted through a collateral nozzle section which may include a reverse thrust unit. The other part may be exhausted directly through a main nozzle also of variable section. The degree to which the engine operates as a turbo-jet or as a ram-jet may depend upon the setting of doors in a ram air duct bypassing the compressor, and upon the portion or proportion of burnt gas supplied to or available to be supplied to, the turbine. The latter factor may depend upon the selective ignition of burners in a single combustion chamber and upon the amount of fuel supplied to such burners by throttles.

An afterburner may be included in the gas stream if desired. For example it may be located in the main housing downstream of the combustion chamber. Secondary or turbine burners can be turned off as the operation is changed towards ram-jet mode, so reducing the risk of damage due to overheating, and conserving fuel.

But in order that the invention may be better understood, reference will now be made to the accompanying drawings which are to be considered as part of this specification and read herewith. In the drawings.

Figure 1:
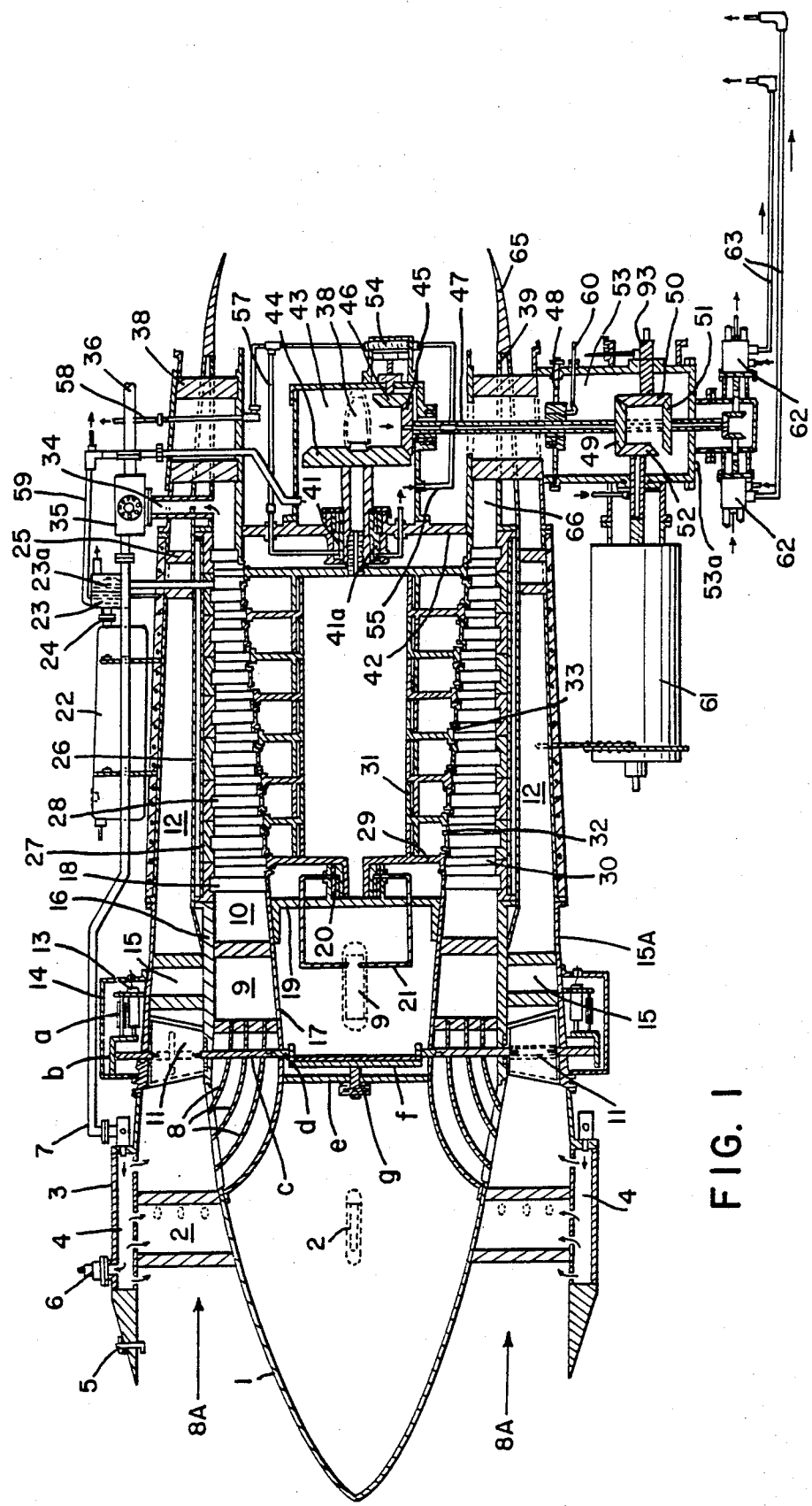
FIG. 1 is an axial section of a forward part of a high speed and/or high altitude jet aircraft engine in a practical embodiment of the invention.

Referring to the drawings in more detail, and to FIG. 1 in particular, there is shown an aircraft jet engine consisting of ten sections (referred to for convenience in the present specifications, but not shown in the drawings, by numerals I to X respectively) interconnected in series by a simple arrangement of nuts and bolts, the first being the forwardmost and the tenth the rearwardmost, section. Thus section II is bolted to the rear of section I, section III to the rear of section II etc. Section I includes nose cone 1 connected by circumferentially-spaced struts 2 to outer casing 3 which defines chamber 4 adapted to receive warm air for de-icing the outer casing when necessary. Warm air flows out of apertures in the radially inner wall of chamber 4. Sensor 5 senses the ambient air temperature. Release valve 6 regulates the air pressure in chamber 4. The latter receives warm air through pipes 7 around the rear of the air intake casing. The pipes themselves may be interconnected.

Curved vanes 8 are located at the rear of nose cone 1 and are connected to struts 9. Vanes 8 act as guides for "ram air" taken into main air intake 8A by forward motion of the aircraft, said vanes 8 guiding the air towards entry 10 to an axial-flow multi-disc air compressor soon to be described.

Section II includes twenty variable-opening ram air doors 11 evenly spaced at 18° intervals around convergent ram air duct 12 and operated by electric servo-motor(s) 13. The top such door is shown open and the bottom closed. The servo-motor(s) can be switched on and off manually or by a computer according to a programmed sequence. Each door 11 may have its own servo-motor, and the operation may be as shown by a, b, c, d, e, f and g, according to which a reduction gear on shaft a is driven by the output from servo-motor 13 and itself drives a co-operating crown wheel b fixed to the outer end of a radial shaft associated with door 11. Doors 11 need not operate independently. Two or more can be made co-operable by an arrangement according to which the axles of the relevant doors may be extended radially inwardly as at c and pass through suitable glands such as d for connexion to bevel gear wheel f which is journalled at g to transverse plate e. Clearly, in such an arrangement, a single motor can be used to open or close all or a number of doors 11 in unison.

Protective cover box 14 fits over the servo motor assembly and both are bolted to the outer casing 3.

Four evenly spaced mounting struts 15 separate the outer casing 15A of ram air duct from the outer casing 16 of air compressor entry 10, in front of which strut 9 separates casing 16 from inner casing 17.

The compressor includes first and second sets of stator blades 18 and 28 respectively and a mounting 19 for front bearing 20 of the compressor. Bearing 20 is lubricated by oil through pipe 21 which passes through one of the mounting struts 9.

Figure 3:
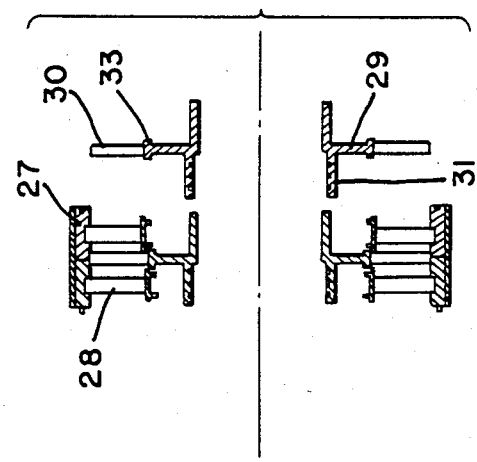
FIG. 3 shows details of an axial-flow multidisc air compressor in the engine illustrated in FIGS. 1 and 2 showing particularly the manner of interconnection of the rotor discs.
Figure 2:
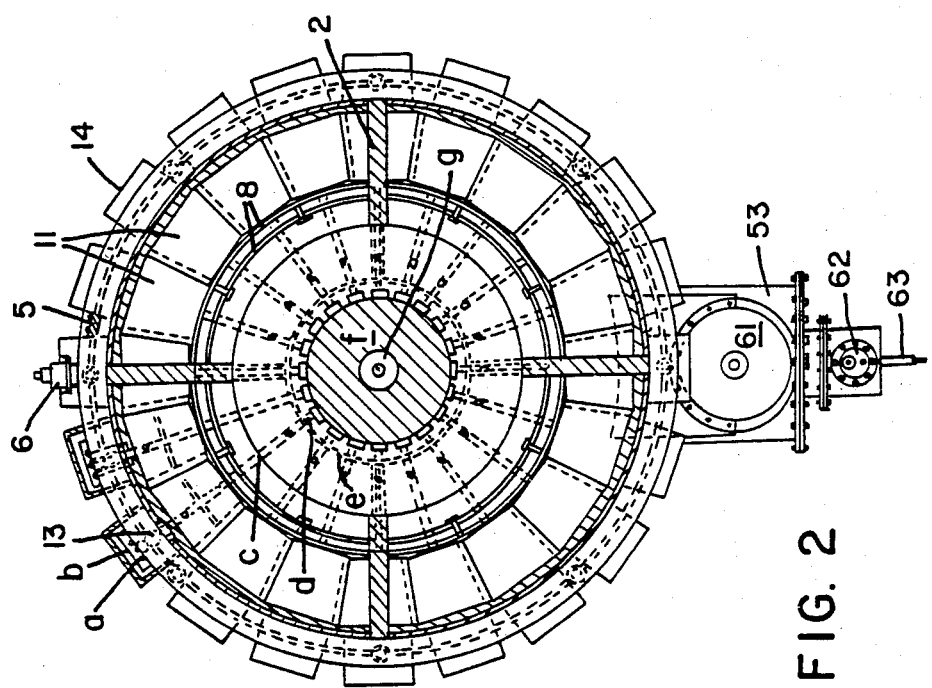
FIG. 2 is a front elevation of the engine illustrated in FIG. 1.

Section III indicates oil tank 22, and an air turbine operated oil pump 23 connected to tank 22 by a pipe containing filter 24 and driven by air from the compressor through an air pipe passing through one of eight mounting struts 25 evenly spaced at about 45° around duct 12. Struts 25 connect the outer casing of duct 12 to a streamlined shell 26 which constitutes an outer cover for compressor casing 27. The compressor further includes elements 29 (see FIG. 3) each having circumferentially-secured rotor blades 30 adapted to rotate between stator blades 28. Elements 29 interconnect by a configuration of grooves and slots 31 such that interrelated parts of the discs form a shaft. Spacers 32 may be located between adjacent elements 29. In Section IV, which is bolted to the rear of the air compressor, warm air is taken from compressor air duct 66 and passes up through tube 34 which itself extends through shell 26 and duct 12 and is bolted to junction box 35 from which air for de-icing the air intake passes through pipe 7 connecting box 35 to the rear of chamber 4. Pipe 36 connects air collector region 37 (see FIG. 4) to box 35 from which air for air-conditioning purposes may also be tapped. Four evenly-spaced (90°) mounting struts 38 are located behind box 35 and extend radially through casings 39 and 40. Rear bearings 41, 41a are supported by mount 42 for upper gear box 43 which houses bevel gears 44, 45 and 46. Wheel 44 is fixed with respect to the after portion of the air compressor shaft. Hollow shaft 47 passes through strut 38 and bearing 48 to connect wheel 45 to wheel 49 and associated wheels 50, 51 and 52 of lower gear box 53. Wheel 50 is fixed to turbine shaft 93. Bolt 53a acts as a drain for gear box 53. Wheel 46 of gear box 43 drives scavenging oil pump 54 which is connected via line 55 to the bottom of box 43. Oil lines 56, 57 and 58 supply oil from pump 54 to compressor front and rear bearings 20 and 41 respectively. Oil is pumped into gear box 43 from pump 23 through line 59. From gear box 43 oil passes through hollow shaft 47 to gear box 53. Bearing 48 is lubricated via line 60.

An overall effect of the gearing is to cause the turbine to rotate somewhat faster than the compressor e.g. at a speed ratio of about 1.5 1.

Gear wheel 52 is connected to starter generator 61 which is switched over to supply electric current after the engine has been started as hereinafter described. Generator 61 is bolted to casing 15A and gear box 53.

Figure 4:
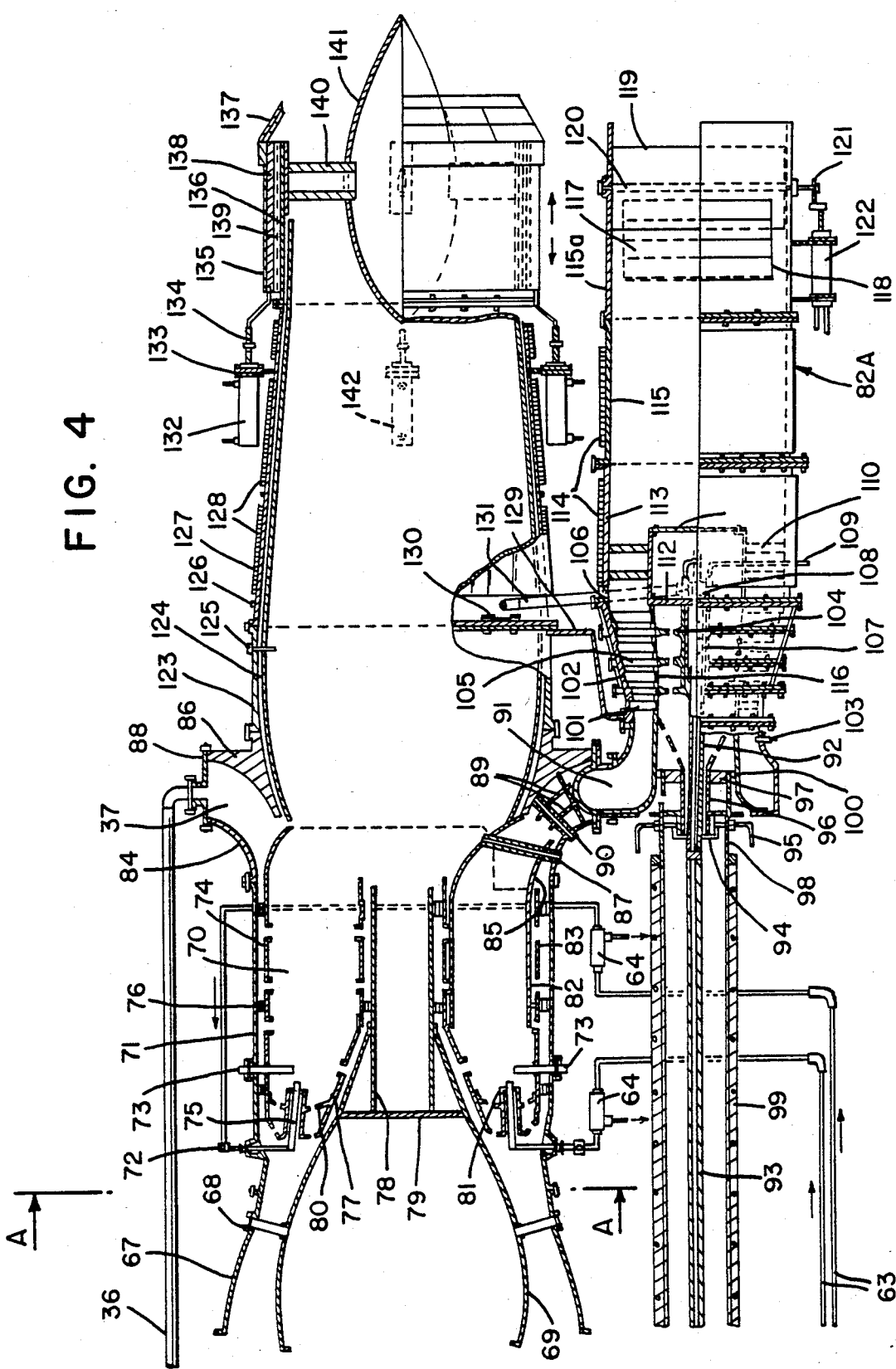
FIG. 4 is an axial section of the after or rearward part of the engine illustrated in FIGS. 1 to 3, being a continuation of the section illustrated in FIG. 1 and including a collateral housing incorporating the turbine.

During starting, gear wheel 52 drives wheel 49 and hence 50 and 51. Wheel 49, by reason of its connection to shaft 47, drives wheel 45 and hence wheel 44 thereby rotating the compressor. Wheel 51 of the lower box 53 is connected to two fuel pumps 62 which supply high-pressure fuel through pipes 63 to two fuel check valves 64 (FIG. 4).

Figures 5, 6, 7:
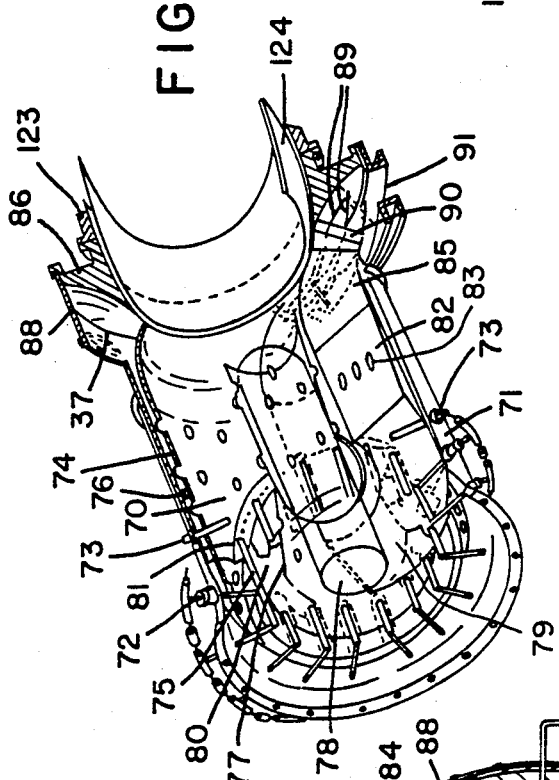
FIG. 5 is a section across line A—A in FIG. 4.
FIG. 6 shows in cutaway perspective, details of a combustion chamber assembly in the engine illustrated in FIGS. 1 to 5 showing particularly a gas duct leading to a gas turbine.
FIG. 7 shows, in cutaway perspective, details of a reverse thrust unit in the engine illustrated in FIGS. 1 to 6.

Section V: referring now to FIG. 1 in particular, shell 26 and casing 39 join to form a lip 65. Immediately downstream of lip 65 the flows of ram air and compressed air from ducts 12 and 66 respectively combine in a channel defined by casings 67 and 69 (see FIG. 4). Casing 67 supports guide vanes or blades 68 for the combined flow. A primary function of blades 68 is to decelerate and compress the flow in ducts 12 and 66 before it passes into a common annular combustion chamber 70 of Section VI now to be described more particularly by reference to FIG. 6.

Opposed (e.g. upper and lower) parts of annular chamber 70 constitute first and second regions respectively, the second being somewhat less than half the total chamber volume. To outer casing 71 are bolted sixteen fuel pipes 72 feeding sixteen (ten primary and six secondary) burners equally spaced around the casing. Two high-energy fuel igniters 73 pass through middle wall 74 for ignition of burners 75. Spacers 76 maintain an air space between 71 and 74 allowing cooling air to flow around chamber 70. Inner wall 77 of the combustion chamber assembly is separated from inner circular frame 78 by the spacers 76 affording access of cooling air to wall 77. Frame 78 is secured to bulkhead 79. Frames 80, 81 are provided around burners 75. Gas duct 82 is adapted to conduct burnt gas from the second (lower) region of chamber 70 to the inlet of a collateral housing (indicated generally by 82A) located beneath or to the side of the main housing and accommodating the turbine to be described hereinafter with reference to Section VII. The lowest six burners are in the second region of chamber 70. Duct 82 is attached by round spacers and bolts 83 to the middle wall 74 of chamber 70.

Figure 8:
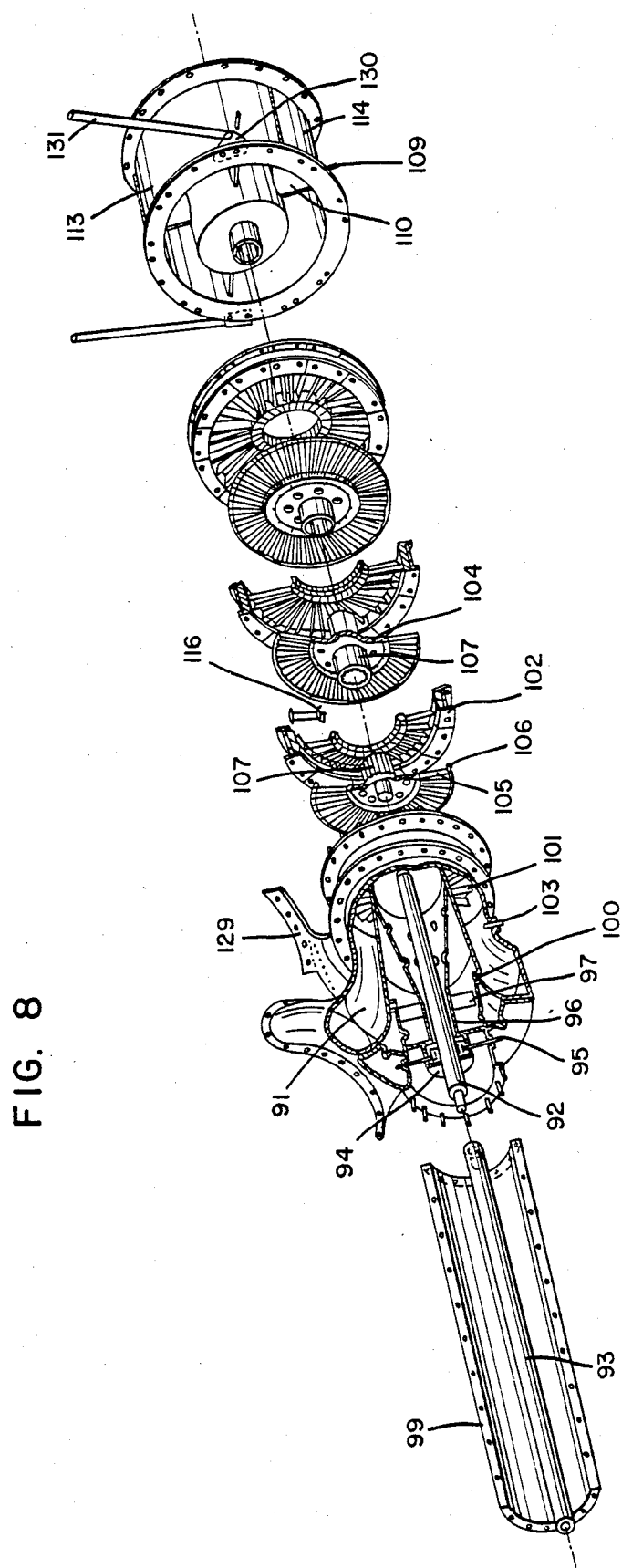
FIG. 8 shows, in "exploded" cutaway perspective, details of the turbine in the collateral housing forming part of the engine illustrated in FIGS. 1 to 7.

Section VII is a gas collector unit. It consists of air collector region 37 defined by front and rear shrouds 84 and 86 respectively. A lower part of 84 is secured to the rear part 85 of duct 82 by long-bolted struts 87. Shrouds 84, 86 are connected by bolting to plate 88. Guide vanes 89 held by struts 90 between shrouds 84, 86 direct gas from duct 82 into opening 91 to the three-stage gas turbine: see especially FIG. 8.

The turbine is connected by shaft 92 to shaft 93 to which is fixed a gear wheel 50 of lower gear box 53 (see FIG. 1). Shaft 92 passes through bearing 94 lubricated by oil through line 95. Bearing 94 is held by mount 96 on struts 97 secured to the inside of outer casing 98 which is in turn attached to protective casing 99 through which passes shaft 93. Casing 99 is split for ease of assembly. Spacers 100 at the rear of casing 98 allow cooling air to flow to the turbine.

At this stage the gas temperature is sensed by thermocouple 103 (alternatively 103 may be located downstream of the turbine) and the gas is passed between stationary blades 101 which straighten the flow. Blades 101 are held by casing 102. Turbine discs 104 hold rotor blades 105 the tips of which are connected to shroud 106 to inhibit gas leakage. Discs 104 interconnect by a configuration of slots and grooves 107 such that interrelated parts form a shaft. Stator blades are secured to casing 102 between the rows of rotor blades 105. The stator blades hold gap formers 116. The last rotor disc joins to the shaft in bearing 108 lubricated by oil through lines 109 extending through four struts 110 equally spaced about cone 111 which holds bearing mount 112. Struts 110 are secured inside rear exhaust 113 which is insulated around the outside by honeycomb blanket 114. Rear exhaust 113 is bolted to an insulated exhaust pipe 115 to the rear of which is bolted gas thrust reverse units 115a: see especially FIG. 7.

Unit 115a includes guide vanes 117 to reflect gas forward to act as a brake at full thrust. Vanes 117 are held vertically between the sides of box 118. Rotatable bucket sections 119 are provided on tubular axles 120 with associated control lever 121. When closed, buckets 119 prevent gas escape from rear exhaust. Control lever is operated by pneumatic jack 122 thrust reverse unit 115a can include a subordinate exhaust gas nozzle.

Sections VIII and IX may include gas diffuser and after burner units (not shown).

Six pneumatic jacks 132 with associated push rods 134 are bolted to the outside of the rear of the main housing. These are to open and close the effective nozzle area of the exhaust unit (Section X) so that a desirable level of efficiency can be maintained over a wide range of thrust.

Section X includes the variable exhaust unit having outer and inner casings 135 and 136 respectively. A variable nozzle 137 is attached to the rear of 135. Struts 140 attach cone 141 to a longitudinally slidable sleeve assembly whereby cone 141 defines with 137 an aperture the effective area of which is a function of the relative axial displacement between the assembly and the housing. This can be effected by means of ram 142.

The engine is started by energizing started generator 61 whereupon fuel pumps 62 force fuel under high pressure to check valves 64 which meter fuel at an appropriate pressure to the burners of two separate fuel mains. Excess fuel may be re-cycled to the fuel tanks. It may be used as a coolant for the oil cooler before returning to the tanks.

It has already been stated that the compressor is preferably caused to turn more slowly than the turbine. This, combined with the shutting down of the secondary burners, may help reduce any tendency on the part of the compressor to overspeed, as might otherwise happen at high aircraft speeds.

When starting and taxiing, only the secondary burners (facing the gas duct) are ignited. One fuel main supplies the ten primary burners. Another supplies the six secondary burners. The main jet thrust may amount to anything up to twice the collateral jet thrust. The ten primary fuel burners may support both ram-jet and (perhaps to a lesser extent) turbo-jet operation.

After the engine becomes self-sustaining, 61 may be used entirely as an electrical generator for the systems.

The basic control may be by means of two throttles. A primary throttle controls fuel flow to the primary burners and a secondary throttle likewise controls the secondary burners. It follows from the foregoing that the secondary throttle affords the essential control for the turbine and compressor.

If desired, suitably-placed thermocouples or thermosensors may be used in order to provide a component of automatic regulation in the fuel supply to the primary and/or secondary burners.

As the primary burners are not followed by a turbine, they can safely and conveniently operate at a substantially higher temperature than the secondary burners, hence the possibility of a much higher thrust from the main nozzle.

The secondary burner flames may suffice to ignite the primary burners when the primary throttle is opened to "ground idle". However, for safety and convenience, an independent fuel igniter may be provided.

For operation at subsonic speeds, doors 11 may be closed, the thrust being produced from both nozzles.

In the transonic region and above, the engine can make effective use of ram air compression because favourable compression ratios can be attained. Thus doors 11 may be opened. Should the compressor overspeed, the secondary burners may be shut down and the ram jet operation maintained with the primary burners developing the relevant thrust wholly or chiefly by way of the main nozzle. For long-range high-speed cruising, the secondary burners may be shut down in order to conserve fuel. While the engine is being operated entirely or largely in the ram-jet mode the compressor may "windmill" and function as a turbine, rotating at a speed that will maintain operation of the fuel pumps and other subsidiary or accessory functions. It may therefore be appropriate to provide an automatic or manual clutch or the like for disconnecting the turbine from the compressor, lest "windmilling" of the latter cause the turbine to act as an extractor.

Before descent from a high altitude cruise, the secondary burners may be re-lit and the compressor and turbine returned to their previous or normal operating speed and conditions, and after decelerating below Mach 1.5, doors 11 may gradually be closed to allow the compressor to become operational by supplying compressed air to the combustion chamber. At top of descent the primary throttle may be fully closed to conserve fuel and the secondary throttle retarded to a "flight idle" position. If desired the primary throttle can be opened to a "flight idle" position before reaching the destination, so as to be in readiness for restoring full power as and when required. During the landing phase the compressor revolutions car be pre-set to a safe and convenient level using the secondary throttle, and thrust changes effected using the primary throttle. Such a *modus operandi* may reduce or eliminate "spin up" time. Once landed the pilot can fully close the primary throttle and obtain such braking as is required by fully or partially opening the secondary throttle and actuating the reverse thrust unit.

The engine is fully shut down by closing the secondary throttle, which cuts off the fuel flow from the six secondary burners. The necessary switches are then turned off to complete the close down operation.

It will be evident from the foregoing that the engine of the invention is economical of fuel and is capable of operation in either turbo-jet or ram-jet mode or a desired combination thereof with the capability of a gradual safe and convenient transition from one to the other, and of maintaining temperatures and other operating conditions within safe efficient and suitable limits having regard to the materials and mechanisms involved.

I have found that by removing the turbine assembly as it were out of the direct line of fire of the combustion chamber, I can greatly increase the temperature in the main part to e.g. of the order of 3500° F. (about 2000°

C.) which is virtually the temperature limit of endurance of the relevant materials themselves, and at the same time readily control within lower limits e.g. up to about 1650° F. (about 900° C.) the temperature of gas ducted off to the turbine. The relatively high temperature in the main part (i.e. the "first region") may make it possible to dispense with gas diffusers, after-burners and the like, giving a shorter housing, a lighter engine and fuel economy.

It will also be clear that the engine is simple to operate and is capable in particular of efficient operation at very high altitudes and speeds.

For the purposes of this specification terms such as "top", "up", "upper" and "lower" are to be understood as referring to the aircraft flying, as illustrated, with the collateral housing beneath the main housing, and they are not to be regarded as necessarily limiting.

I claim:

1. A high-speed, high-altitude aircraft jet engine capable of operating in a turbo-jet or a ram-jet mode, or a combination thereof, said engine comprising: air intake means adapted to receive an inflow of air due to forward motion of the aircraft; means for dividing said inflow air into a first inflow portion and a second inflow portion; a compressor adapted to receive and compress said first inflow portion; a combustion chamber downstream of said compressor and adapted to receive an air feed including said compressed air, said combustion chamber including a primary region and a secondary region; first bypass means downstream of said air intake means and upstream of said compressor capable of admitting said second inflow portion to a bypass passage to enter said combustion chamber substantially as ram air and bypassing said compressor; confluence means upstream of said combustion chamber for combining said compressed air and said ram air; valve means for regulating the relative proportion of compressed air and ram air entering the combustion chamber; a plurality of primary burners in said combustion chamber and adapted to admit fuel to said primary region to generate a high-temperature first gas portion in said primary region of said combustion chamber; a plurality of secondary burners in said combustion chamber and adapted to admit fuel to said secondary region to generate a lower temperature second gas portion in said secondary region of said combustion chamber; a turbine downstream of said secondary region of said combustion chamber and drivable by said second gas portion; duct means for conveying said second gas portion from said combustion chamber to said turbine; connection means to establish a mechanical drive connection between said turbine and said compressor; exhaust nozzle means downstream of said combustion chamber; second bypass means capable of conveying said first gas portion to said exhaust nozzle means and bypassing said turbine; and throttle means for selectively controlling fuel flow to said primary and secondary burners.

2. An engine as claimed in claim 1 wherein said valve means include variable-opening ram air doors for varying the effective flow area at an inlet to said bypass passage.

3. An engine as claimed in claim 1 wherein said exhaust nozzle means include distinct main and subordinate nozzles for said first and second gas portions, respectively.

4. An engine as claimed in claim 3 wherein said turbine and said subordinate nozzle are accommodated in a collateral housing separate from a main housing accommodating said compressor and said combustion chamber, and communicating with said main housing by said duct means.

5. An engine as claimed in claim 3 including means for varying the effective cross section of at least one of said main and subordinate nozzles and said duct means.

6. An engine as claimed in claim 3 including thrust reversing means at said subordinate nozzle.

7. An engine as claimed in claim 1 wherein said connection means is disconnectible so that the engine is operable substantially as a ram-jet engine with the compressor acting as a drive means for driving subsidiary or accessory functions of said engine.

* * * * *